United States Patent [19]

Sugie, Masuo et al.

[11] Patent Number: 4,789,651
[45] Date of Patent: Dec. 6, 1988

[54] PROCESS FOR PRODUCING A ZIRCONIA REFRACTORY BODY AND A PRODUCT PRODUCED BY THE PROCESS

[75] Inventors: Sugie, Masuo, Tokoname; Kurihara, Koji, Yamagata; Aiba, Yoshiro, Anjo; Maeda, Toshiaki, Yamagata, all of Japan

[73] Assignee: Toshiba Ceramics Co., Ltd., Tokyo, Japan

[21] Appl. No.: 899,638

[22] Filed: Aug. 25, 1986

Related U.S. Application Data

[63] Continuation-in-part of Ser. No. 631,903, Jul. 18, 1984, abandoned.

[30] Foreign Application Priority Data

Aug. 11, 1983 [JP] Japan .................. 58-147076

[51] Int. Cl.$^4$ .................................. C04B 35/48
[52] U.S. Cl. ...................... 501/103; 264/63; 264/56; 501/104
[58] Field of Search .............. 264/56, 66, 325, 63; 501/104, 103

[56] References Cited

U.S. PATENT DOCUMENTS 3,887,387 6/1975 Sturhahn .
3,929,498 12/1975 Hancock et al. .
4,035,191 7/1977 Johns .................... 501/104
4,328,295 5/1982 Tanaka et al. .
4,344,904 8/1982 Yamada et al. ............. 264/66
4,360,598 11/1982 Otagiri et al. ............. 264/56
4,430,279 2/1984 Hugio et al. ............... 264/65

OTHER PUBLICATIONS

Chemical Abstracts, vol. 73, No. 14, (Oct. 5, 1987), pp. 199, 69440t.

Primary Examiner—James Derrington
Attorney, Agent, or Firm—Oblon, Fisher, Spivak, McClelland & Maier

[57] ABSTRACT

A high mechanical strength of zirconia refractory body can be provided by a process for producing the refractory body made of at least partially stabilized zirconia and having a predetermined shape comprising:

mixing fine particles of zirconia belonging to a monoclinic system, fine particles of stabilizer composed of at least one substance selected from a group consisting essentially of MgO, CaO and $Y_2O_3$ and a binder;

granulating the resulting mixture to form granulated particles;

shaping the granulated mixture into a predetermined form; and firing the shaped mass thus formed in such a condition as to cause sintering of the zirconia particles and stabilization of zirconia simultaneously.

28 Claims, 1 Drawing Sheet

_(4,789,651)_

PROCESS FOR PRODUCING A ZIRCONIA REFRACTORY BODY AND A PRODUCT PRODUCED BY THE PROCESS

CROSS-REFERENCE TO RELATED APPLICATION

The present application is a continuation-in-part of application Ser. No. 631,903, filed July 18, 1984, now abandoned.

DETAILED DESCRIPTION OF THE INVENTION

Figure 1:
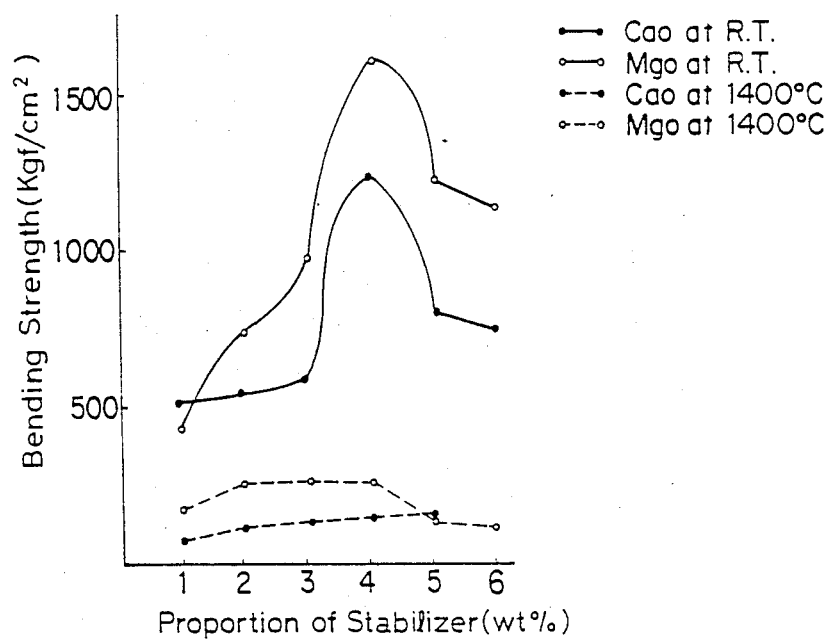

This invention relates to a process for producing a zirconia refractory body and a product produced by the process.

Zirconia is known as a specific or unique refractory material whose thermal expansion and contraction are irreversible, and it is also known that addition of a stabilizer such as MgO, CaO or $Y_2O_3$ to zirconia serves for stabilizing the zirconia.

The commercially available zirconia refractory bodies of given shapes are generally manufactured by adding the stabilizer to zirconia in a predetermined ratio, electrofusing and then solidifying this mixture to prepare so-called electrofused zirconia, pulverizing this electrofused zirconia into fine particles, forming the given shape out of the fine particles of the electrofused zirconia and firing or burning thus electrofused and formed particulate zirconia.

However, the zirconia refractory body produced by such conventional method is relatively highly porous with its apparent porosity being on the order of 17 to 20%, and is also unsatisfactory in its mechanical and physical properties such as the bending strength thereof. Moreover, such zirconia refractory body is not highly resistant to the peeling. Therefore the conventional zirconia refractories are hardly applied to uses such as a stationary plate and a slide plate of a slide gate system for a casting ladle or other similar container such as a tundish where the high peeling resistance is required.

Furthermore, the conventional zirconia refractory body is disadvantageous, because the particles around its surface is likely to be peeled off or removed from the surface upon polishing the surface due to its low strength, which results in the degradation in the smoothness of the surface.

Other conventional process for producing a zirconia refractory body of a predetermined shape comprises a step of forming the predetermined shape out of powder of so-called "burned (or fired) zirconia" and a step of firing or sintering the powder at a temperature of about 1650° C. The powder of the burned zirconia commercially available is made of stabilized zirconia particles prepared by mixing zirconia particles having a particle size of about 0.5–5 μm with stabilizer particles of 0.5–10 μm, firing this mixture at a temperature of about 1650° C. to produce a stabilized zirconia, and pulverizing the stabilized zirconia to produce fine particles of the burned zirconia.

The zirconia refractory body obtained from this conventional process, is, however, also relatively porous, low in its bulk specific gravity and in its apparent specific gravity, and insufficient or unsatisfactory in its strength such as compression strength and bending strength for use as the stationary or slide plate of the slide gate system for controlling the flow rate of molten steel for example.

Inventors have tried to apply zirconia refractories having essentially high corrosion resistance to a refractory body such as a stationary or slide plate of the slide gate system which is required to have high corrosion resistance and high mechanical strength, by eliminating or reducing the defective properties of the conventional zirconia refractories such as unsatisfactory mechanical strength, and have accomplished this invention.

Thus, the present invention has been made in consideration of the prior art problems, and its object is to provide a process for producing a zirconia refractory body which is high not only in corrosion resistance but also in mechanical strength, especially in bending strength, and also to provide a zirconia refractory body with high mechanical strength etc. which can be obtained by the process.

According to this invention, the above-mentioned object can be accomplished by a process for producing a refractory body made of at least partially stabilized zirconia and having a predetermined shape comprising:

(1) mixing fine particles of zirconia having a monoclinic crystal structure, fine particles of a stabilizer composed of at least one substance selected from the group consisting of MgO, CaO and $Y_2O_3$ and a binder, said zirconia particles having an average size of 0.5 to 5 μm comprising 30 to 70% by weight of particles of a diameter of 0.1 to 5 μm and 70 to 30% by weight of particles of a diameter of 5 to 10 μm and said stabilizer particles being of a size small enough to pass through a Tyler standard sieve of 325 mesh (44 μm), (2) granulating the resulting mixture to form granulated particles comprising 30 to 70% by weight of particles of a diameter of 1 to 70 μm and 70 to 30% by weight of particles of a diameter of 70 to 170 μm, (3) shaping the granulated mixture into a predetermined form and (4) firing the shaped mass thus formed at a temperature of 1,600° to 1,850° C. to promote sintering and stabilization of the zirconia particles simultaneously.

According to the process of this invention, because the granulated mixture of the fine particles of zirconia of the monoclinic system with the fine particles of the stabilizer is used, it is possible to produce a refractory body of zirconia having a relatively high degree of stabilization upon firing or burning the mixed powder. And especially, because the sintering of the zirconia particles and the stabilization of zirconia are caused simultaneously in the firing or burning step by firing the preformed mixed powder of the particles of the zirconia of the monoclinic system with the stabilizer particles according to the process of this invention, the sintering of the zirconia particles is promoted, and it is possible to obtain a zirconia refractory body of the predetermined shape which is denser and mechanically stronger than that obtained by the conventional methods in which the stabilization treatment and the sintering treatment has been carried out separately, that is, the sintering treatment has been made after the stabilization of zirconia.

The zirconia refractory body obtained according to preferred embodiments of the process of this invention is higher in compression strength and bending strength, and is improved in resistance to peeling and spalling than the zirconia refractory bodies obtained by the conventional methods.

In order to maximize such effects, both of the zirconia particles and the stabilizer particles are preferably small in size, because the speed of the stabilization reaction as well as the degree of sintering become low, if the particle sizes are too large. Therefore, it is preferred that each of the zirconia particles and the stabilizer particles has a size small enough to pass through a Tyler standard sieve of 325 meshes (44 μm). More preferably the average size of the zirconia particles is of the order of 0.5 to 5 μm and the zirconia particles comprises 30 to 70% by weight of particles of a diameter of 0.1 to 5 μm and 70 to 30% by weight of particles of a diameter of 5 to 10 μm. In the case where the average size of the zirconia particles is over 5 μm, the such zirconia particles may be further ground to the average size of 0.5 to 5 μm after or at the time of mixing with the stabilizer particles. In case the average size of zirconia particles is less than 0.5 μm, the contraction or shrinkage of the refractories upon firing or burning becomes more than 10%. Therefore it becomes difficult to obtain the predetermined shape of the refractory body. Moreover, there is fear that the produced refractory body will become less resistant to the spalling and the peeling, because of the excessively low apparent porosity of less than 10% in the produced refractory body.

The zirconia of the monoclinic system may be, for example, natural or naturally occurring baddeleyite, or such type of zirconia which can be obtained by decomposing and refining zircon.

The proportion of the stabilizer particles in the mixed powder of the zirconia and the stabilizer should preferably be within a limited range. If the proportion of the stabilizer is too low, there is fear that zirconia will not be stabilized to a desired degree in the zirconia refractory body produced by firing, which leads to the fear that the produced zirconia refractory body is likely to be cracked by an abnormal expansion thereof upon the crystalline phase transition of the zirconia and that the bending strength of the zirconia refractory body may be lowered.

On the other hand, if the proportion of the stabilizer is too high, there is fear that the produced zirconia refractory body will be less resistant to corrosion by the molten steel and/or the slag.

In view of the above-mentioned reasons, the proportion of the stabilizer particles in the mixed particles of zirconia and stabilizer is preferably selected to be within a range of 2 to 6% by weight based on the total weight of the mixed particles of zirconia and stabilizer. If the weight proportion is more than 6%, the produced zirconia refractory body has high thermal expansion coefficient and is less resistant to the spalling.

Preferably a binder is added to the particles after or at the time of mixing the particles of zirconia and stabilizer. The binder may be an organic binder such as CMC (carboxymethyl cellulose or sodium derivative thereof), PVA (polyvinyl alcohol) and waste pulp liquor, or an inorganic binder such as water. The mixture of the particles of zirconia and stabilizer bound by the binder is then granulated to form granulated particles comprising 30 to 70% by weight of a diameter of 1 to 70 μm and 70 to 30% by weight of particles of a diameter of 70 to 170 μm.

The firing or burning of the mixed powder of zirconia and stabilizer granulated by means of the binder is carried out after having shaped the granulated mixture into a predetermined or desired form for the use of the refractory body by means of a suitable molding or forming apparatus if necessary. The firing or burning is preferably carried out in an oxidizing atmosphere such as in air at a temperature within a range of 1,600° to 1,850° C., more preferably within a range of 1,700° to 1,850° C. so that both of the reaction for stabilizing the zirconia and the sintering of zirconia particles will proceed simultaneously and parallel with each other. The firing or burning temperature may be chosen depending on the particle sizes of both pulverized zirconia and stabilizer used, but generally, if the firing temperature is too low, there is fear that both of the stabilization reaction and the sintering may not proceed at a desired rate and/or to a desired degree, while if the firing temperature is too high, there is fear that the preform of the granulated mixture may be excessively contracted or shrinked to be the resulting refractory body during the firing, which results not only in the difficulties of producing the predetermined shape or sizes of zirconia refractory body but also in the excessively low or small porosity of the zirconia refractory body having less resistance to the spalling.

In the case where the average size of the zirconia particles are 0.5 to 5 μm and where the firing temperature is from 1,600° to 1,850° C., the period of time to be maintained is preferably about 5 to 10 hours.

As described above, a zirconia refractory body made of at least partially stabilized zirconia and having a predetermined shape is produced, according to a preferred embodiment of the present invention, by a process comprising:

(1) mixing fine particles of zirconia having a monoclinic crystal structure, fine particles of a stabilizer composed of at least one substance selected from the group consisting of MgO, CaO and $Y_2O_3$ and a binder, said zirconia particles having an average size of 0.5 to 5 μm comprising 30 to 70% by weight of particles of a diameter of 0.1 to 5 μm and 70 to 30% by weight of particles of a diameter of 5 to 10 μm and said stabilizer particles being of a size small enough to pass through a Tyler standard sieve of 325 mesh (44 μm).

(2) granulating the resulting mixture to form granulated particles comprising 30 to 70% by weight of particles of a diameter of 1 to 70 μm and 70 to 30% by weight of particles of a diameter of 70 to 170 μm.

(3) shaping the granulated mixture into a predetermined form and (4) firing the shaped mass thus formed at a temperature of 1,600° to 1,850° C. to promote sintering and stabilization of the zirconia particles simultaneously.

Figure 2:
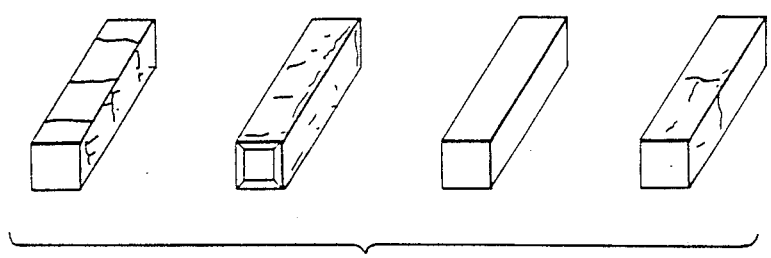

The present invention is to be described more in details referring to the accompanying drawings, by which the foregoing and other objects, as well as the features of this invention will be made clearer, and in which:

FIG. 1 is a graph showing the bending strength, at R. T. (room temperature) and at 1400° C., of various samples zirconia refractory body produced by preferred embodiments of the process according to this invention by changing the proportion of the stabilizer MgO or CaO to the total weight of the mixture of the zirconia and stabilizer from 1 to 6% by weight; and FIGS. 2 (a) to (d) are the illustrations showing the results of the spalling test.

The invention will be further described below by way of the examples.

EXAMPLE 1 AND COMPARATIVE EXAMPLE 1

Mixtures of the baddeleyite powder or particles and the sea water magnesia powder or particles were prepared by mixing the baddeleyite particles having sizes small enough to pass through the Tyler standard sieve of 325 meshes (44 μm) with the sea water magnesia particles having a size small enough to pass through the Tyler standard sieve of 325 meshes, the latter being mixed in amounts of 1, 2, 3, 4, 5 and 6% by weight based on the weight of the mixture of the baddeleyite and the sea water magnesia, respectively, and these mixtures of the particles were further ground to an average particle size of 4 μm to prepare six types of powder mixture (Sample Numbers 1 to 6) comprising 50% by weight of particles of a diameter of 0.1 to 5 μm and 50% by weight of particles of a diameter of 5 to 10 μm. After having granulated each of the six types of ground mixtures by adding 7% by weight (based on the weight of the mixture of the baddeleyite powder and the sea water magnesia powder) of PVA (polyvinyl alcohol) to each of the ground mixtures to form granulated particles comprising 50% by weight of particles of a diameter of 1 to 70 μm and 50% by weight of particles of a diameter of 70 to 170 μm, each of the six types of granulated mixture was formed into a square pillar in shape as a preform under a pressure of 1,000 kgf/cm². The six types of preform were fired or burned in air at 1,750° C. for 5 hours to produce six types of zirconia refractory body in the form of square pillar. A comparative sample (Sample Number 7) was prepared in the following way;

At first, mixture of the baddeleyite particles and the magnesia particles was prepared by mixing the magnesia particles in an amount of 3% by weight based on the weight of the mixture of the baddeleyite particles and the stabilizer particles, and this mixture was electrofused and stabilized to produce an electrofused zirconia block. The electrofused zirconia block was then pulverized and ground into electrofused zirconia powder having an average particle size of 4 μm. This electrofused zirconia powder was granulated by means of the PVA, the granulated zirconia was formed into a square pillar in shape and then fired under the same conditions as in the case of Samples 1 to 6 to prepare a comparative zirconia refractory body.

The physical and mechanical properties of the six types of zirconia refractory bodies (Example 1: Sample Nos. 1 to 6) obtained by the preferred embodiments of the process according to this invention and of the comparative zirconia refractory body (Comparative Example) are shown in the Table 1 and FIG. 1.

As seen from the Table 1 and FIG. 1, the bending strength of the zirconia refractory bodies of Samples 1 to 6 is more than twice as high as that of the comparative zirconia refractory body (Comparative Example 1) at R. T. (room temperature) and at 1,400° C., in other words, in the temperature range of from room temperature to about 1,400° C.

The test results on bending strength of the zirconia refractory bodies of Samples 1 to 6 also show that either a too high or a too low proportion of MgO will decrease the bending strength of the zirconia refractory body produced.

TABLE 1

Properties of Zirconia Refractory Body Dependent on MgO Proportion in Comparison with Comparative Example

| Sample No. | Example 1 | | | | | | Comparative Example 1 |
|---|---|---|---|---|---|---|---|
| | 1 | 2 | 3 | 4 | 5 | 6 | 7 |
| MgO (wt %) | 1 | 2 | 3 | 4 | 5 | 6 | 3 |
| Bulk specific gravity | 5.30 | 4.99 | 4.53 | 4.59 | 4.64 | 4.63 | 4.63 |
| Apparent specific gravity | 5.52 | 5.58 | 5.59 | 5.58 | 5.48 | 5.49 | |
| Apparent porosity (%) | 3.8 | 10.4 | 19.0 | 17.7 | 15.3 | 15.7 | 16.9 |
| Bending strength (kgf/cm²) at Room temp. | 422 | 756 | 970 | 1605 | 1255 | 1150 | 210 |
| Bending strength (kgf/cm²) at 1,400° C. | 181 | 259 | 268 | 260 | 121 | 112 | 52 |
| Dynamic modulus of elasticity (10⁶ kg/cm²) | 0.90 | 1.18 | 1.09 | 1.21 | 1.30 | 1.32 | 0.39 |
| Compression strength (kgf/cm²) | 1650 | 2680 | 3460 | 3600 | 3110 | 2760 | 850 |
| Coefficient of thermal shock resistance R | 84 | 118 | 142 | 120 | 103 | 98 | 77 |

According to the Table 1, the dynamic modules of elasticity of the zirconia refractory bodies of Samples 1 to 6 is considerably higher than that of the comparative zirconia refractory body (Sample No. 7), which suggests that the zirconia refractory bodies of Samples 1 to 6 have higher strength and higher resistance to the spalling than the comparative zirconia refractory body.

It is also seen from the Table 1 that Samples 3 and 4 have much higher compression strength and bending strength both at low and high temperatures than the comparative zirconia refractory body, and have moderate resistance to the spalling because the apparent porosity of the Samples 3 and 4 is at the level of 17.7 to 19.0%.

As further noted from the Table 1, the thermal shock resistance coefficient R of the zirconia refractory bodies containing MgO as the stabilizer is maximized when the proportion of MgO is about 3% by weight, and also the coefficient R is considerably greater than that of the comparative zirconia refractory body (Sample No. 7) when the MgO proportion is in the range of 2 to 6% by weight, which indicates that the zirconia refractory bodies containing MgO as the stabilizer is superior to the comparative zirconia refractory body in the spalling resistance, especially in the thermal spalling resistance, where the thermal shock resistance coefficient R is given by the following equation:

$$R = \frac{S(1 - \gamma)}{E\alpha}$$

wherein S is a breaking strength derived from the bending of the zirconia refractory body, E is a Young's modulus of the zirconia refractory body, $\gamma$ is Poisson's ratio of the zirconia refractory body, and $\alpha$ is linear expansion coefficient of the zirconia refractory body.

The improvement in spalling resistance of the zirconia refractory body produced in accordance with this invention could be confirmed by a spalling test in which each test piece was first maintained at 1,300° C. for 30 minutes and then rapidly quenched by throwing the test piece into water. As a result of the test conducted on the zirconia refractory bodies of Samples 2, 3 and 4 and the comparative zirconia refractory body, as seen from FIGS. 2 (b), (c), (d) and (a) respectively, no crack was produced in the refractory body of Sample 3 shown in FIG. 2(c), while some cracks were formed in the refractory bodies of Samples 2 and 4 (FIGS. 2(b) and (d) respectively). In contrast, large and serious cracks were produced in the refractory body of the comparative example (FIG. 2(a)).

In another test, each of the plate-like zirconia refractory bodies of Samples 1 to 6 and that of the comparative example (Sample No. 7) was applied, after a proper surface treatment thereof, to the slide plate of a slide gate system for controlling the discharge of the molten steel from the casting ladle.

As a result, a peeling phenomenon (fine cracks are formed and the surface peels off partly) occurred on the sliding face of the slide plate of the comparative example whereas no such peeling phenomenon was observed in the plates of Samples 1 to 6. These results indicate the superiority of the refractory bodies of Samples 1 to 6 to that of the comparative example in the peeling resistance, too. It was also found that number of normally operated times of each slide plate of Samples 1 to 6 was more than twice as many as that of the conventional slide plates made from high alumina refractories or alumina-carbon refractories.

In the above-described embodiments of this invention, magnesia was used as the stabilizer, but almost the same effects were obtained in case of the zirconia refractory bodies produced in the same way according to this invention using calcia or yttria in place of magnesia as shown in FIG. 1 and Table 2 or 3.

For instance, in case of using CaO as the stabilizer, as seen from FIG. 1, the bending strength of the produced zirconia refractory bodies at RT (room temperature) is maximized when the proportion of the stabilizer is about 4% by weight based on the weight of the mixture of calcia and baddeleyite as in the case of Sample 4.

TABLE 2

Properties of Zirconia Refractory Body Dependent on CaO Proportion

| Sample No. | 8 | 9 | 10 | 11 | 12 | 13 |
|---|---|---|---|---|---|---|
| CaO (wt %) | 1 | 2 | 3 | 4 | 5 | 6 |
| Bulk specific gravity | 5.07 | 4.90 | 4.50 | 4.52 | 4.40 | 4.19 |
| Apparent specific gravity | 5.57 | 5.62 | 5.66 | 5.78 | 5.64 | 5.58 |
| Apparent porosity (%) | 9.0 | 12.8 | 20.5 | 21.8 | 22.0 | 24.0 |
| Bending strength at Room temp. (kgf/cm$^2$) | 519 | 562 | 600 | 1225 | 812 | 765 |

TABLE 3

Properties of Zirconia Refractory Body Dependent on Y$_2$O$_3$ Proportion

| Sample No. | 14 | 15 | 16 | 17 | 18 | 19 |
|---|---|---|---|---|---|---|
| Y$_2$O$_3$ (wt %) | 1 | 2 | 3 | 4 | 5 | 6 |
| Bulk specific gravity | 5.28 | 5.02 | 4.79 | 4.91 | 5.11 | 5.20 |
| Apparent specific gravity | 5.60 | 5.73 | 5.82 | 5.88 | 5.79 | 5.88 |
| Apparent porosity (%) | 12.2 | 15.2 | 17.6 | 18.8 | 20.6 | 26.3 |
| Bending strength at Room temp. (kgf/cm$^2$) | 431 | 595 | 639 | 615 | 573 | 515 |

EXAMPLE 2 AND COMPARATIVE EXAMPLE 2

Dependence of the properties of the zirconia refractory bodies on the average size of the baddeleyite particles to be fired was investigated (Table 4). The refractory bodies of the Sample Nos. 20 and 21 were produced in the form of disk (40 mm in diameter and 40 mm in height) in the same way as that of the Sample No. 3 in the Example 1 except that the average particle size of the baddeleyite in the Sample No. 20 was 0.3 μm. Table 4 shows that the smaller the average size of the baddeleyite particles to be subjected to the firing is, the higher the ratio of contraction or shrinkage, of the preform, during firing is, although the compression strength of the produced refractory body is enhanced.

TABLE 4

Properties of Zirconia Refractory Body Dependent on Particle Size

| Sample No. | Comparative Example 2<br>20 | Example 2<br>21 |
|---|---|---|
| Average size of baddeleyite particles (μm) | 0.3 | 4.0 |
| Bulk specific gravity | 5.20 | 4.45 |
| Apparent porosity (%) | 6.5 | 20.3 |
| Compression strength at R.T. (kgf/cm$^2$) | 3500 | 1100 |
| Contraction ratio (%) | −14.8 | −2.5 |

EXAMPLE 3

Dependence of the properties of the zirconia refractory bodies on the firing temperature was investigated (Table 5). The refractory bodies of the Sample Nos. 22, 23 and 24 each including 4% by weight of MgO particles based on the mixture of the baddeleyite particles and the MgO particles were produced in the same way as the refractory body of the Sample No. 4 in the Example 1 except that the firing temperature was 1600° C., 1730° C. and 1850° C. for the Samples 22, 23 and 24 respectively. Table 5 shows that the higher the firing temperature is, the lower the apparent porosity of the produced refractory body is although the bending strength thereof is enhanced.

TABLE 5

Properties of Zirconia Refractory Body Dependent on Firing Temperature

| Sample No. | 22 | 23 | 24 |
|---|---|---|---|
| Firing Temperature (°C.) | 1600 | 1730 | 1850 |
| Bulk Specific gravity | 4.19 | 4.59 | 5.5 |
| Apparent specific gravity | 5.63 | 5.58 | 5.60 |
| Apparent porosity (%) | 25.6 | 17.7 | 8.04 |
| Bending strength at RT (Kgf/cm$^2$) | 765 | 1605 | 1530 |

As the preformed mixture of the fine particles of the zirconia belonging to a monoclinic system with the fine particles of the stabilizer is, as described above, subjected to the simultaneous treatment of sintering and stabilization according to the process of this invention, there can be obtained a zirconia refractory body having unique properties not found in the conventional zirconia refractory materials. Thanks to the excellent mechanical and physical properties such as high bending strength, high thermal spalling resistance, and high corrosion resistance, etc., the zirconia refractory body obtained from the process of this invention can be used not only as a refractory plate such as the slide plate and the stationary plate of a slide gate system but also more widely as the other refractory bodies to be used under the strict conditions.

What is claimed is:

1. A refractory body made of at least partially stabilized zirconia and having a predetermined shape, produced by a process comprising the steps of:
   (1) mixing particles consisting of fine particles of zirconia having a monoclinic crystal structure and fine particles of a stabilizer composed of at least one substance selected from the group consisting of MgO, CaO and $Y_2O_3$ with a binder, said zirconia particles having an average size of 0.5 to 5 $\mu$m comprising 30 to 70% by weight of particles of a diameter of 5 to 10 $\mu$m and said stabilizer particles being of a size small enough to pass through a Tyler standard sieve of 325 mesh (44 $\mu$m), and an amount of the fine particles of the stabilizer mixed being not less than 2% by weight based on a total weight of the zirconia and stabilizer particles,
   (2) granulating the resulting mixture to form granulated particles comprising 30 to 70% by weight of particles of a diameter of 1 to 70 $\mu$m and 70 to 30% by weight of particles of a diameter of 70 to 170 $\mu$m,
   (3) shaping the granulated mixture into a predetermined form and
   (4) firing the shaped mass thus formed at a temperature of 1,600° to 1,850° C. to promote sintering and stabilization of the zirconia particles simultaneously.

2. The refractory body according to claim 1, wherein the firing temperature is 1,700° to 1,850° C.

3. The refractory body according to claim 1 or 2, wherein the firing is carried out for 5 to 10 hours.

4. The refractory body according to claim 1, wherein an amount of the fine particles of stabilizer mixed is not more than 6% by weight based on a total weight of the zirconia and stabilizer particles.

5. The refractory body according to claim 1, wherein the binder is added to the zirconia and stabilizer particles after or at the time of mixing the particles of zirconia and stabilizer.

6. The refractory body according to claim 1, wherein the binder is an organic binder and/or an inorganic binder.

7. The refractory body according to claim 6, wherein the organic binder is selected from the group consisting of carboxymethyl cellulose or sodium derivative thereof, polyvinyl alcohol and waste pulp liquor.

8. The refractory body according to claim 6, wherein the inorganic binder is water.

9. The refractory body according to claim 1, wherein during the mixing of the fine particles of zirconia and the stabilizer particles, the mixture is ground into a fine particles.

10. The refractory body according to claim 1, wherein the particles of zirconia are particles of baddeleyite.

11. The refractory body according to claim 1, wherein the zirconia is obtained by decomposing and refining zircon.

12. The refractory body according to claim 1, wherein the stabilizer consists of MgO.

13. The refractory body according to claim 1, wherein the stabilizer consists of CaO.

14. The refractory body according to claim 1, wherein the stabilizer consists of $Y_2O_3$.

15. A process for producing a refractory body made of at least partially stabilized zirconia and having a predetermined shape, comprising the steps of:
   (1) mixing particles consisting of fine particles of zirconia having a monoclinic crystal structure and fine particles of a stabilizer composed of at least one substance selected from the group consisting of MgO, CaO and $Y_2O_3$ with a binder, said zirconia particles having an average size of 0.5 to 5 $\mu$m comprising 30 to 70% by weight of particles of a diameter of 0.1 to 5 $\mu$m and 70 to 30% by weight of particles of a diameter of 5 to 10 $\mu$m and said stabilizer particles being of a size small enough to pass through a Tyler standard sieve of 325 mesh (44 $\mu$m), and the fine particles of the stabilizer being mixed in an amount of not less than 2% by weight of the zirconia and stabilizer particles,
   (2) granulating the resulting mixture to form granulated particles comprising 30 to 70% by weight of particles of a diameter of 1 to 70 $\mu$m and 70 to 30% by weight of particles of a diameter of 70 to 170 $\mu$m,
   (3) shaping the granulate mixture into a predetermined form and
   (4) firing the shaped mass thus formed at a temperature of 1,600° to 1,850° C. to promote sintering and stabilization of the zirconia particles simultaneously.

16. The process according to claim 16, wherein the firing temperature is 1,700° to 1,850° C.

17. The process according to claim 15 or 16, wherein the firing is carried out for 5 to 10 hours.

18. The process according to claim 15, wherein the fine particles of stabilizer is mixed in an amount of not more than 6% by weight based on a total weight of the zirconia and stabilizer particles.

19. The process according to claim 15, wherein the binder is added to the zirconia and stabilizer particles after or at the time of mixing the particles of zirconia and stabilizer.

20. The process according to claim 15, wherein the binder is an organic binder and/or an inorganic binder.

21. The process according to claim 20, wherein the organic binder is selected from the group consisting of carboxymethyl cellulose or sodium derivative thereof, polyvinyl alcohol and waste pulp liquor.

22. The process according to claim 20, wherein the inorganic binder is water.

23. The process according to claim 15, wherein during the mixing of the fine particles of zirconia and the stabilizer particles, the mixture is ground into a fine particles.

24. The process according to claim 15, wherein the particles of zirconia are particles of baddeleyite.

25. The process according to claim 15, wherein the zirconia is obtained by decomposing and refining zircon.

26. The process according to claim 15, wherein the stabilizer consists of MgO.

27. The process according to claim 15, wherein the stabilizer consists of CaO.

28. The process according to claim 15, wherein the stabilizer consists of $Y_2O_3$.

* * * * *